B. P. CRANDALL
Velocipede.
No. 3,207. Reissued Nov. 24, 1868.
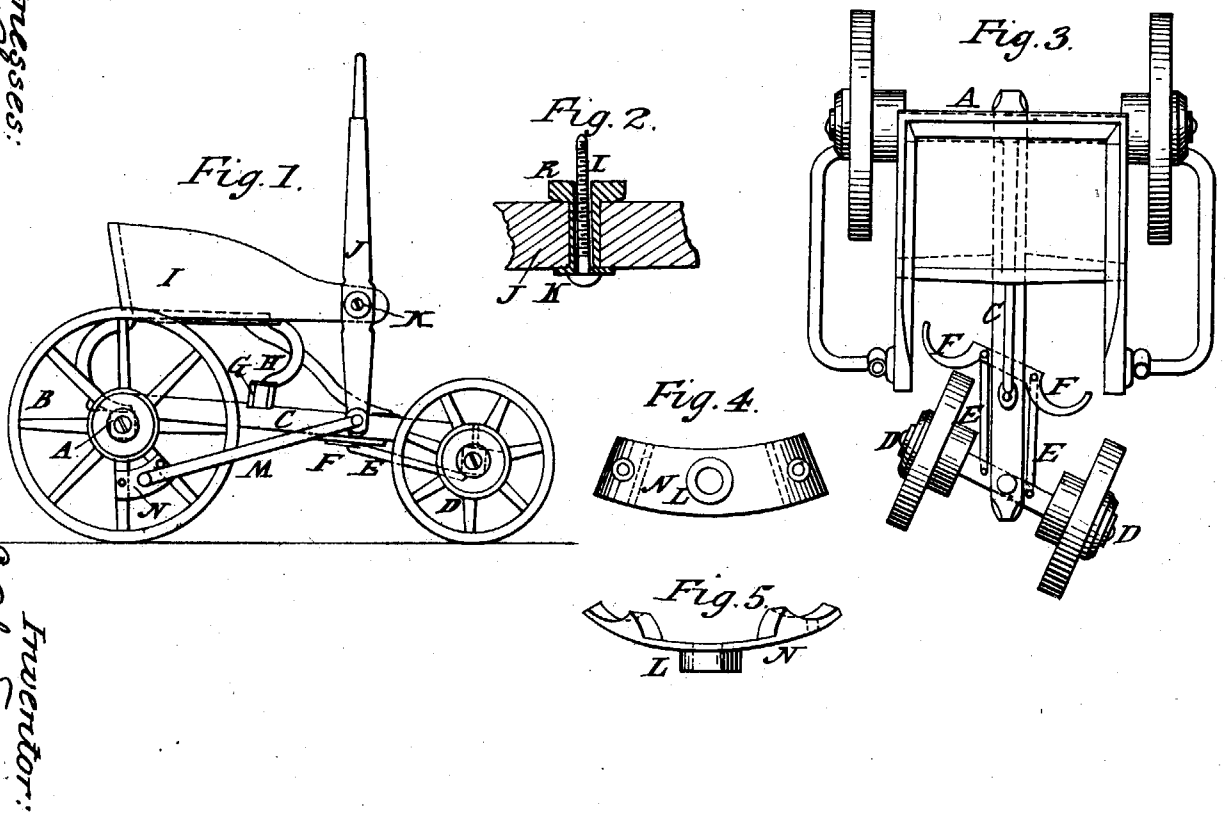
Witnesses:
Geo. H. Rodwell
Joshua Monroe
Inventor:
B. P. Crandall
by Munn & Co.
N. PETERS. Photo-Lithographer. Washington, D. C.

United States Patent Office.

BENJAMIN P. CRANDALL, OF NEW YORK, N. Y.

*Letters Patent No.* 79,553, *dated July* 7, 1868; *reissue No.* 3,207, *dated November* 24, 1868.

VELOCIPEDE.

The Schedule referred to in these Letters Patent and making part of the same.

*To all whom it may concern:*

Be it known that I, BENJAMIN P. CRANDALL, of the city, county, and State of New York, have invented certain new and useful Improvements in Velocipedes; and I do hereby declare the following to be a clear and exact description of the nature thereof, sufficient to enable others skilled in the art to which my invention appertains, to fully understand and use the same, reference being had to the accompanying drawings, making part of this specification, in which—

Figure 1 is a side elevation of the velocipede.

Figures 2, 4, and 5 are views of detached parts.

Figure 3 is a plan view.

Similar letters of reference indicate corresponding parts in the several figures.

My invention consists in certain improvements in velocipedes, as will be hereinafter more fully described.

In the drawings—

A represents the axles, on which are mounted the driving-wheels B.

C is a pole or reach, whose rear end is secured to the axle B.

Its forward end is pivoted to a short axle, on which are mounted the steering-wheels D.

At a proper point of the pole C, I pivot a yoke F, which consists of a suitable piece of metal or wood, projecting from both sides of the pole, so as to allow the feet of the rider to rest thereon, and move the yoke, as will be necessary, relative to the position the steering-wheels D are to assume.

The yoke and axle of the said wheels are connected together by rods or bars, E, which are pivoted to the yoke and axle, either crossing or parallel to each other. By these rods or bars the yoke is within convenient reach of the rider, and allows the steering-wheels to be placed sufficiently far in front of them, so as to operate the steering-apparatus in a very easy manner, and cause the turning of the velocipede without loss of power.

The seat I is mounted through the medium of the axle A and springs H, which are secured to a bar, G, resting upon the pole C.

The operating-levers or handles J are constructed as ordinarily, and are pivoted to the pitmen or connecting-rods, M, for communicating power to the driving-wheels B.

The levers or handles J have their bearings in tubular supports, K. Each support consists of a hollow cylinder, of length equal to the transverse thickness of the levers, and has at one end a flange, R, by which the support is secured to the seat I, whose sides should project sufficiently beyond the seat proper for this purpose.

An opening is made in the lever, so that it may be hung on the support, and have its bearing thereby. A screw, I, is now introduced transversely into the support, and screwed into the seat J, a washer being beforehand interposed between the outer end of the support and the head of the screw.

The lever, therefore, has a free and steady movement, and is not subjected to the ordinary wearing or rubbing actions which always result when the holding-screw is passed directly through the lever.

The connections M have their forward and rear ends bent at right angles, to admit of their ready attachment to the handles and the driving-wheels, and not interfere with the free operation thereof. The connections are attached to the wheels by means of plates, N, which are made, by preference, of cast malleable iron, and adapted to cover the space between two or more spokes, and be secured thereto by means of screws, or other suitable fastening. A lug, *l*, may be formed on the outer side of each plate, as additional bearings for the rear end of the pitman-rod, M. The latter is ordinarily pivoted directly to the spokes by means of screws, and in a short time the screws work loose, and weaken as well as materially change the fine appearance of the wheel. By the plates N, I overcome these difficulties, and take the strain from an individual spoke, and distribute it somewhat on the whole wheel.

The plates are complete in themselves, always ready to be applied to the spokes, and may be removed when desired or necessary. In the old mode of making velocipedes, one of the spokes required to be enlarged, to form an attachment for the rear end of the connection-rod. By my invention, all the spokes are formed alike, so that the plate N can be applied to any two of them. The lug *l* may be of any thickness and size, so as to form a greater or less bearing for the end of the connection-rod. The durability of the rod and plate is affected accordingly. Motion is readily imparted to the wheels B, by simply moving the handles to and fro, the handles turning freely upon the tubular supports, and imparting motion to the wheels through the connections M.

The tubular supports, to receive the handles, add greatly to the strength of the apparatus, while the vehicle is more easily and directly guided and operated by means of the yoke and connections, than by any other mode now in use.

The construction of the machine, as just recited, renders it much more durable and easy of operation than the ordinary velocipedes now in use.

Having thus described my invention,

What I claim as new, and desire to secure by Letters Patent, is—

1. The combination, with the operating-lever J, of a tubular support, K R, and the independent screw, L, substantially as described.

2. As an improvement in the mode of operating the steering-apparatus of velocipedes, the pivoted rods E, in combination with the yoke F and the steering-wheels D, substantially as described.

3. As a new article of manufacture, the detachable cast metallic plates N, when applied to the spokes of the wheels, for the purpose described.

4. As an improvement in the patent granted to Crandall and Conover, dated April 2, 1861, the connecting-rods M, bent at both ends, in combination with the wheels B, substantially as described.

To the above, I have signed my name, this 2d day of October, 1868.

BENJAMIN P. CRANDALL.

Witnesses:

W. B. HUMBERT,

EDW. CRANDALL.